Jan. 6, 1953
B. F. GREIMAN
2,624,261
CULTIVATOR SHIELD
Filed Jan. 13, 1950
2 SHEETS—SHEET 1
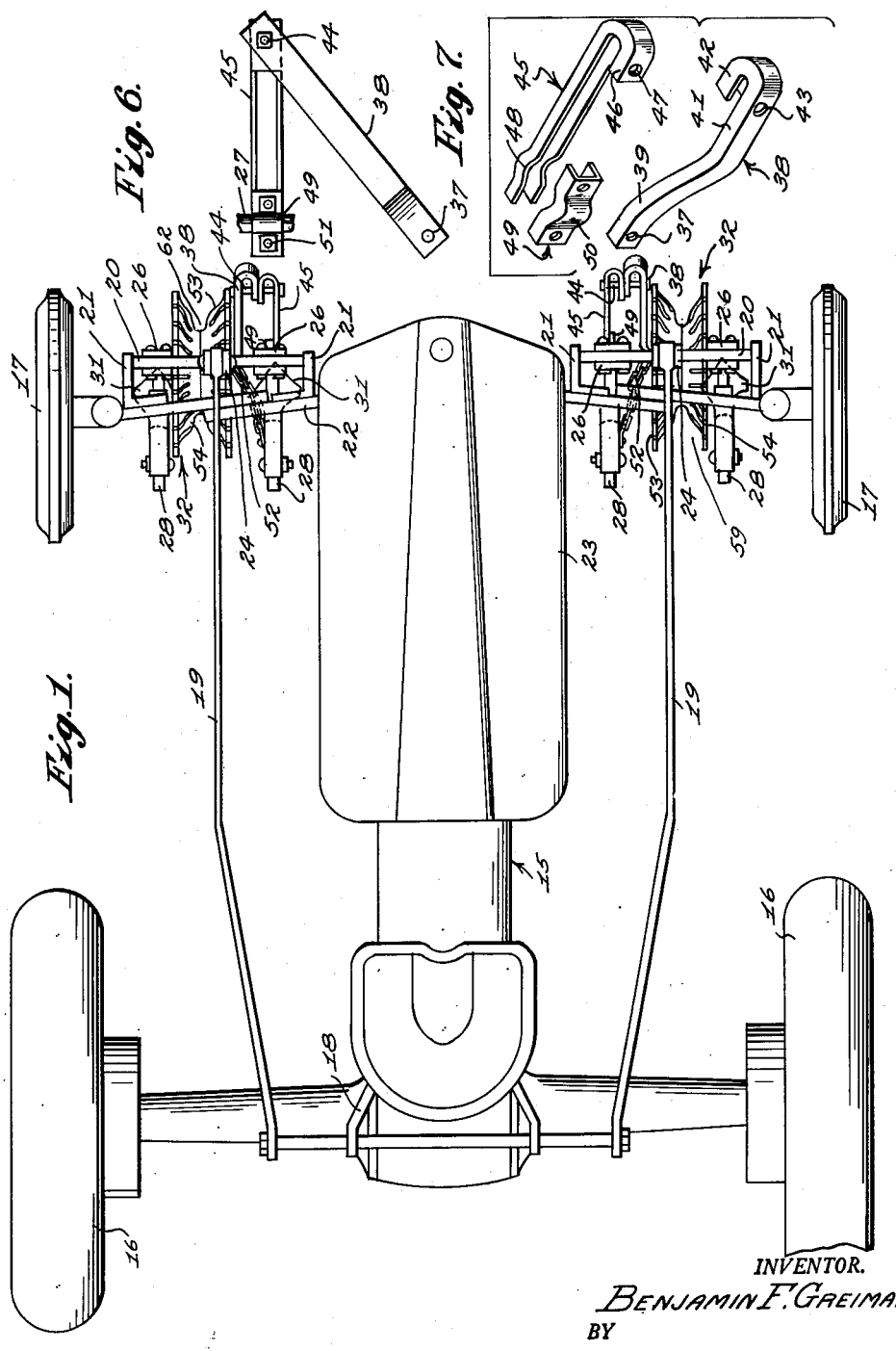
INVENTOR.
BENJAMIN F. GREIMAN
BY
McMorrow, Berman & Davidson
ATTORNEYS Jan. 6, 1953   B. F. GREIMAN   2,624,261
CULTIVATOR SHIELD
Filed Jan. 13, 1950   2 SHEETS—SHEET 2
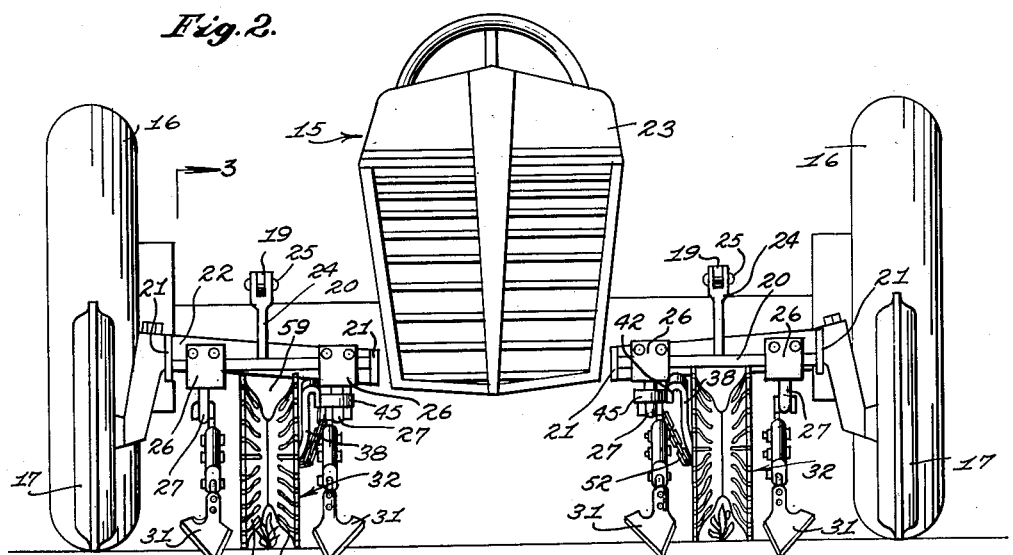
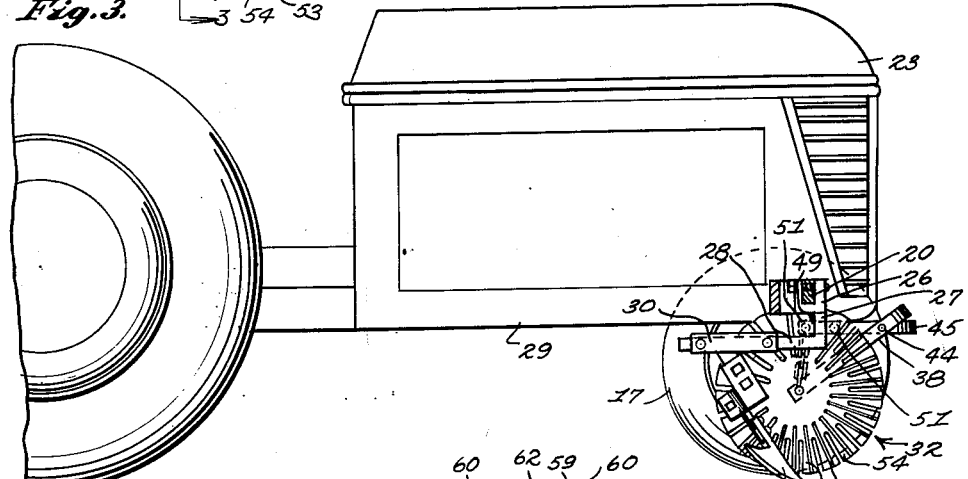
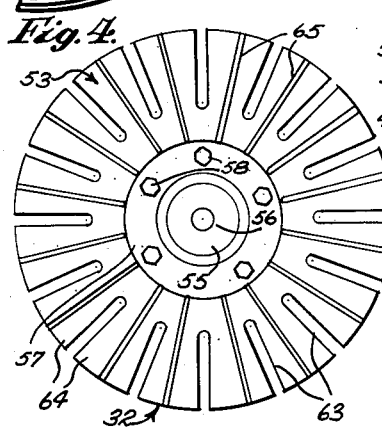
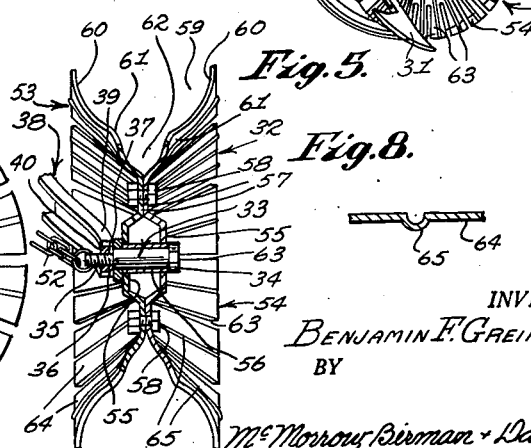
INVENTOR.
BENJAMIN F. GREIMAN
BY
McMorrow, Berman & Davidson
ATTORNEYS Patented Jan. 6, 1953

2,624,261

UNITED STATES PATENT OFFICE 2,624,261

CULTIVATOR SHIELD

Benjamin F. Greiman, Garner, Iowa

Application January 13, 1950, Serial No. 138,437

2 Claims. (Cl. 97—188)

My invention relates to improvements in cultivator shields.

A primary object of my invention is to provide a rotary type cultivator shield for use with tractor mounted cultivators which will greatly facilitate the rapid cultivating of any row crop during the critical period, when the plants are small.

A further object is to provide a rotary cultivator shield which provides adequate clearance for accommodating corn, large bean plants and the like.

A further object of the invention is to provide a cultivator shield of the above-mentioned character which is adapted to be mounted upon all standard makes of cultivators.

A further object is to provide a rotary cultivator shield which is highly simplified in construction, compact and extremely strong and durable.

A further object is to provide a rotary cultivator shield including means for introducing or sifting finely divided soil around the small row crop and repelling large clods, stalks, trash and the like and depositing the same between the rows.

A still further object is to provide a rotary cultivator shield of the above-mentioned character which will not clog nor pick up litter during its operation, the shield being very easy to apply to or remove from the cultivator, and adjust.

A further object of the invention is to provide a rotary cultivator shield which will completely cover and protect young corn, beans or row crops during their early cultivation.

A further object is to provide a rotary cultivator shield of the above-mentioned character which has only one point of attachment to the cultivator which carries it, whereby maximum clearance on all sides of the cultivator shield is provided, so that there is little likelihood of the shield becoming clogged with trash or the like.

Other objects and advantages of the invention will be apparent during the course of the following description.

In the accompanying drawings forming part of this application, and in which like numerals are employed to designate like parts throughout the same:

Figure 1 is a plan view of a tractor mounted cultivator having a pair of cultivator shields embodying my invention applied thereto;

Figure 2 is a front end elevation of the tractor as illustrated in Figure 1;

Figure 3 is a vertical section taken on line 3—3 of Figure 2;

Figure 4 is an enlarged, side elevation of a cultivator shield removed;

Figure 5 is an enlarged, central, vertical section through a cultivator shield and associated elements;

Figure 6 is an enlarged, fragmentary, side elevation of cultivator shield mounting arms and associated elements removed;

Figure 7 is a perspective view of the cultivator mounting arms; and

Figure 8 is an enlarged, fragmentary section taken on line 8—8 of Figure 4.

In the drawings, where, for the purpose of illustration, is shown a preferred embodiment of the invention, the numeral 15 designates a tractor or conventional construction and including rear traction wheels 16 and front wheels 17, as shown. The tractor embodies a conventional power lift 18 operable for shifting a pair of longitudinally extending, generally horizontal rods 19 longitudinally forwardly and rearwardly. The tractor is equipped with a standard type front end cultivator adjacent to and between the front wheels 17, and this cultivator comprises a pair of transverse, horizontal rock shafts 20 journaled at their opposite ends in bearing brackets 21 rigidly secured in any suitable manner to the front, transverse axle beam 22 of the tractor. The rock shafts 20 are disposed between the engine 23 and front wheels 17, as shown, and near and slightly below the elevation of the tops of the front wheels, Figure 2. Upstanding arms or cranks 24 are rigidly secured by welding or the like to the rock shafts 20 near their longitudinal centers, and the tops of the arms 24 are pivotally connected, as at 25, with the forward ends of the rods 19. It is thus evident that when the power lift 18 shifts the rods 19 longitudinally forwardly and rearwardly, the arms 24 will rock the shafts 20 upon their longitudinal axes.

Rigidly secured to the rock shafts 20 near and slightly inwardly of their opposite ends are clamp brackets 26 having rigidly secured thereto short, depending, vertical shanks or shafts 27, in turn having rigidly secured to their bottom ends rearwardly extending, horizontal, longitudinal arms or bars 28. The bars 28 are disposed near and slightly below the main frame 29 of the tractor, Figure 3. Brackets 30 are longitudinally adjustably mounted upon the arms or bars 28, and secured to the brackets 30 and extending below the same are laterally spaced, inclined shovels 31. As clearly shown in Figures 1 and 2, the shovels 31 are arranged in pairs upon opposite sides of the tractor and between the front wheels 17 and engine 23 of the tractor. The shovels 31 of the pairs are transversely spaced apart, as shown, and disposed substantially adjacent to the opposite ends of the rock shafts 20. The arrangement is such that when the power lift 18 is operated for rocking the shafts 20, the shovels 31 and associated elements are raised and lowered in unison.

My cultivator shields are designated generally by the numeral 32, and a pair of the shields 32 are disposed between each pair of shovels 31, as shown, so that the forward tips of the shovels are arranged substantially adjacent to the transverse axes of rotation of the shields 32, such axes being in alignment.

The cultivator shields 32 are freely rotatably mounted upon short, transverse, horizontal shafts 33 provided at their outer ends with heads 34 and at their inner ends with reduced screw-threaded extensions 35 forming shoulders 36. The reduced, screw-threaded extensions 35 engage through openings 37 formed in the rear or lower ends of elongated, inclined support arms or bars 38 including rear portions or extensions 39 which are offset laterally outwardly or toward the wheels 17. The arms 38 are channel shaped in transverse cross-section, and the shafts 33 are rigidly secured to the rear ends of the arms 38 by nuts 40 mounted upon the screw-threaded extensions 35 and arranged between the longitudinal side flanges of the channel-shaped arms 38, so that the nuts cannot rotate. The arms 38 further include forward or upper portions 41 which are straight and disposed adjacent to the inner sides of the shields 32, Figure 2. As shown in Figure 3, the arms 38 extend radially of the shields 32, and the portions 41 of the arms are formed at their forward ends to provide hook-like extensions 42 integral therewith and spaced laterally inwardly or toward the center of the tractor with respect to the portions 41 of the arms. The portions 41 and extensions 42 are apertured, as at 43, for the reception of hinge bolts 44 which serve to pivotally connect the forward ends of the support arms 38 with companion, elongated, horizontal, longitudinal arms 45 disposed adjacent to the inner sides of the hooked extensions 34, Figure 1.

The arms 45 are provided at their forward ends with laterally outwardly facing, hook-like extensions 46 disposed in opposition to the extensions 42, as shown. The extensions 46 and forward ends of the arms 45 are apertured, as at 47, for receiving the hinge bolts 44 which extend entirely through the arms 38 and 45 and the opposed contacting extensions 42 and 46, Figure 1. The hinge bolts 44 thus serve to pivotally connect the forward ends of the arms 38 and 45. The arms 45 are preferably channel shaped in transverse cross-section, and are spaced laterally inwardly of the arms 38 and substantially adjacent to the inner shovels 31 of the pairs of shovels. The horizontal arms 45 are disposed substantially at the elevation of the arms 28, and slightly above such arms, Figure 3, and the rear ends of the arms 45 extend adjacent to the depending shanks 27, as shown. Near their rear ends, the arms 45 are preferably offset or formed, as at 48, so that the inner sides of the arms 45 may be seated against the inner sides of the shanks 27. The arms 45 are rigidly secured to the depending shank 27 by means of detachable clamp brackets or caps 49, laterally outwardly offset, as at 50, so that the inner faces of the brackets 49 may be seated against the outer sides of the shanks 27. The arms 45 and brackets 49 are rigidly clamped against the opposite sides of the shanks 27 by means of bolts 51 or the like. In this manner, the arms 45 are thus held rigidly and horizontally when the front end cultivator is in its lowered or operative position, Figures 1, 2 and 3. The support arms 38 are free to partake of vertical swinging movement, so that the rotary shields 32 may follow the contours of the ground.

Chains 52 are disposed adjacent to the inner sides of the cultivator shields 32, and have their lowermost links connected with the inner ends of screw-threaded extensions 35, Figure 5, and these chains extend upwardly from the shields 32 for connection with any conveniently located part of the vertically swingable cultivator. Chains 52 have sufficient slack to permit support arms 38 to swing vertically sufficiently to allow the rotary cultivator shields 32 to follow the contours of the ground, but when the front end cultivator is raised to its inoperative position by the power lift 18, the chains will tighten and lift the cultivator shields from contact with the ground.

The rotary cultivator shields 32 are identical, and each shield 32 comprises a pair of opposed, contacting, circular shield sections or discs 53 and 54 provided near their centers with oppositely axially offset portions or plates 55 arranged in axially spaced relation, as shown, and forming the hub of the rotary cultivator shield. The plates 55 are provided with central, axially aligned openings within which are rigidly secured by welding or the like horizontal, axial, cylindrical sleeves or bearings 56 rotatably mounted upon the short shafts 33, as shown. The opposite ends of the sleeves 56 terminate flush with the outer faces of the plates 55. The plates 55 forming the hub of the shield are disposed between the head 34 of the shaft 33 and the adjacent arm portion 39. In this manner, each cultivator shield 32 is freely rotatably mounted upon one of the shafts 33 and held against any substantial end play or axial movement. Radially outwardly of the sleeve 56, the shield sections or discs 53 and 54 include annular, flat, contacting portions or bands 57 which are radially narrow and disposed near the radial center of the cultivator shield 32. The contacting, annular portions 57 are rigidly secured together in assembly by means of bolts 58 or the like. The shield sections or discs 53 and 54 diverge radially outwardly of the annular portions 57 for forming wide, annular spaces or passages 59 between the peripheral portions 60 of the discs 53 and 54, such peripheral portions being substantially radial. The discs 53 and 54 are axially inwardly formed or offset, as at 61, between the peripheral portions 60 and annular portions or bands 57 for forming relatively narrow, radially inner, annular passages 62 which taper radially inwardly slightly, as shown. The passages 62 lead into the outer passages 59.

Between the offset portions or shoulders 61 and peripheral portions 60, the discs 53 and 54 are provided with a plurality of circumferentially equidistantly spaced, radial slots 63 which extend through the peripheral edges of the discs. These radial slots 63 form separate, circumferentially spaced, radial segments or blades 64 which are provided at their transverse centers with radially extending ribs or embossings 65 which serve to stiffen the segments 64. The radial embossings 65 extend from the peripheral edges of the discs 53 and 54 to the peripheries of the annular sections or bands 57. The shield sections or discs 53 and 54 are preferably formed of steel stampings or the like, and are extremely tough and durable.

The operation of my cultivator shields is as follows:

With the front end cultivator lowered into its operative position, as shown in the drawings, the cultivator shields 32 are disposed in engagement with the ground and the support arms 38 are free to partake of vertical swinging movement so that the cultivator shields may follow the contours of the ground. The cultivator shields 32 rotate because of their frictional contact with the ground. The tractor may now be driven forwardly, the wheels of the tractor straddling two adjacent rows of young corn or the like. The pairs of shovels 31 cultivate the ground upon opposite sides of the rows of corn in the usual manner. As best shown in Figure 2, the rotary cultivator shields 32 roll directly over the young corn in the rows. The combined radial width of the annular passages 59 and 62 is sufficient to accommodate the corn or other similar row crops while the crops are still young enough to necessitate the use of cultivator shields.

When my shields 32 are used, the tractor may be driven in high gear at a substantial rate of speed without liability of damaging the row crop. The sections or discs 53 and 54 of the shields deflect large clods of earth, stalks and other rubbish laterally outwardly and away from the crop disposed within the passages 59 and 62. The shields 32, of course, revolve as they roll over the ground, and finely divided soil is sifted through the slots 63 and about the base of the small corn shoots or the like. This finely divided soil which is sifted around the small shoots covers and smothers out pigeon grass and other obnoxious weeds.

When the tractor reaches the end of the row, the power take-off 18 may be operated for lifting the front end cultivator and cultivator shields 32 out of engagement with the ground so that the tractor may be turned around for cultivating the next pair of adjacent rows. When the cultivator is lifted, the slack in the chains 52 is taken up, so that the chains 52 tighten to lift the cultivator shields from contact with the ground.

Instead of the slots 63, I also contemplate making the discs 53 and 54 solid or imperforate, and if desired, the discs may be provided with a plurality of spaced, circular apertures or openings through which the finely divided soil may be sifted in substantially the same manner that it is sifted through the slots 63.

It is to be understood that the form of my invention herewith shown and described is to be taken as a preferred example of the same, and that various changes in shape, size and arrangement of parts may be resorted to without departing from the spirit of my invention or the scope of the subjoined claims.

Having thus described the invention, I claim:

1. In a cultivator, a horizontal axis fender wheel comprising a pair of similar and oppositely dished disks having convex axially inward sides and concave axially outward sides, the convex inward sides of the disks having limited central annular portions in contact, the disks being formed radially outwardly of the contacting annular portions with relatively narrow radial slots opening through the peripheral edges of the disks, the slots being circumferentially spaced around the disks to define relatively wide segments therebetween, and a tubular shaft bearing fixed at the axial center of and secured to the disks for accommodating a fender wheel mounting shaft.

2. In a cultivator, a horizontal axis fender wheel comprising a pair of similar and oppositely dished disks having convex axially inward sides and concave axially outward sides, the convex inward sides of the disks having limited central annular portions in contact, the disks being formed radially outwardly of the contacting annular portions with relatively narrow radial slots opening through the peripheral edges of the disks, the slots being circumferentially spaced around the disks to define relatively wide segments therebetween, and a tubular shaft bearing fixed at the axial center of and secured to the disks for accommodating a fender wheel mounting shaft, portions of the convex inward sides of the disks immediately radially outward of said central annular portions being in acutely radially outwardly divergent relation to define a relatively narrow annular channel and other portions of the convex sides of the disks radially outward of the last mentioned portions being in more greatly divergent relation to define a relatively wide annular channel.

BENJAMIN F. GREIMAN.

REFERENCES CITED

The following references are of record in the file of this patent:

UNITED STATES PATENTS

| Number | Name | Date |
| --- | --- | --- |
| 107,777 | Homrighouse | Sept. 27, 1870 |
| 270,812 | Kenner | Jan. 16, 1883 |
| 835,664 | Connell | Nov. 13, 1906 |
| 975,326 | Byrd | Nov. 8, 1910 |
| 1,349,419 | Garst | Aug. 10, 1920 |